(12) United States Patent
Vettaikaran et al.

(10) Patent No.: US 12,267,292 B2
(45) Date of Patent: *Apr. 1, 2025

(54) SYSTEMS AND METHODS FOR DETECTING CONFLICTS IN INTERNET SERVICES

(71) Applicant: NAMECHEAP, INC., Phoenix, AZ (US)

(72) Inventors: Mohan Vettaikaran, Spring Hill, FL (US); Artem Zakharchenko, Vila Nova de Gaia (PT); Richard Kirkendall, Los Angeles, CA (US); Vlad Fedosov, Kharkov (UA); João Henrique Guedes, Maia (PT)

(73) Assignee: NAMECHEAP, INC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,547

(22) Filed: Nov. 30, 2023

(65) Prior Publication Data

US 2024/0106790 A1    Mar. 28, 2024

Related U.S. Application Data

(63) Continuation of application No. 17/875,824, filed on Jul. 28, 2022, now Pat. No. 11,838,260, which is a
(Continued)

(51) Int. Cl.
*H04L 61/2521* (2022.01)
*H04L 61/103* (2022.01)
(Continued)

(52) U.S. Cl.
CPC ........ *H04L 61/2535* (2013.01); *H04L 61/103* (2013.01); *H04L 61/4511* (2022.05);
(Continued)

(58) Field of Classification Search
CPC ............... H04L 61/103; H04L 61/1511; H04L 61/1541; H04L 61/2061; H04L 61/2046;
(Continued)

(56) References Cited

U.S. PATENT DOCUMENTS 8,683,043 B1 * 3/2014 Peters ................ G06Q 30/0605
709/219
9,391,949 B1 * 7/2016 Richardson ......... H04L 61/3005
(Continued)

FOREIGN PATENT DOCUMENTS

WO     2009047784 A2     4/2009
WO     2021188746 A1     9/2021

OTHER PUBLICATIONS

GITHUB—Domain-Connect-2.1, v 2.1, revision 57, Mar. 7, 2019, 43pages, [retrieved on Jan. 8, 2021]. Retrieved from the Internet <URL: https://github.com/Domain- Connect/spec/blob/83363c4b4a700d6dae55cdd32bf8d8fd953d79aa/Domain%20Connect%20Spec%20Draft.adoc>.
(Continued)

*Primary Examiner* — Cheikh T Ndiaye
(74) *Attorney, Agent, or Firm* — HAYNES BEFFEL & WOLFELD LLP; Andrew L. Dunlap; Paul A. Durdik

(57) ABSTRACT

The technology disclosed relates to detection and resolution of conflicts between requested internet services and package of internet services associated with a domain. The method disclosed includes receiving a request from a client to add a requested internet service to a package of internet services. The method includes searching a domain name system (DNS) database for DNS records or a DNS server for external domains having attribute fields indicating attributes of the internet services in the package of internet services. The method includes comparing attributes of the requested internet service to attribute fields for the internet services in the package of internet services using a set of conflict
(Continued)

definitions to identify attributes of the internet service requested conflicting with attributes of the package of internet services. When conflicting attributes are identified, the method includes invoking a resolution process to resolve the conflict.

20 Claims, 13 Drawing Sheets

Related U.S. Application Data continuation of application No. 17/344,824, filed on Jun. 10, 2021, now Pat. No. 11,438,304, which is a continuation of application No. 16/823,265, filed on Mar. 18, 2020, now Pat. No. 11,038,839.

(51) Int. Cl.
*H04L 61/4511* (2022.01)
*H04L 61/4541* (2022.01)
*H04L 61/5061* (2022.01)
*H04L 101/00* (2022.01)
*H04L 101/686* (2022.01)

(52) U.S. Cl.
CPC ...... *H04L 61/4541* (2022.05); *H04L 61/5061* (2022.05); *H04L 2101/00* (2022.05); *H04L 2101/686* (2022.05)

(58) Field of Classification Search
CPC ............. H04L 61/6086; H04L 61/2069; H04L 61/2535
See application file for complete search history.

(56) References Cited

U.S. PATENT DOCUMENTS

| | | | |
|---|---|---|---|
| 9,813,303 B1* | 11/2017 | Guigli | H04L 61/5014 |
| 11,038,839 B1 | 6/2021 | Vettaikaran et al. | |
| 11,038,840 B1 | 6/2021 | Vettaikaran et al. | |
| 11,399,008 B2 | 7/2022 | Vettaikaran et al. | |
| 11,438,304 B2 | 9/2022 | Vettaikaran et al. | |
| 11,838,260 B2 | 12/2023 | Vettaikaran et al. | |
| 11,848,908 B2 | 12/2023 | Vettaikaran et al. | |
| 2008/0235778 A1 | 9/2008 | Fratti et al. | |
| 2010/0070569 A1* | 3/2010 | Turakhia | H04L 61/4511 709/203 |
| 2011/0044184 A1 | 2/2011 | Balasaygun et al. | |
| 2012/0324113 A1* | 12/2012 | Prince | H04L 61/4511 709/226 |
| 2013/0326599 A1 | 12/2013 | Bray et al. | |
| 2014/0181312 A1 | 6/2014 | Rutten et al. | |
| 2015/0067114 A1 | 3/2015 | Ruggeri | |
| 2016/0182441 A1* | 6/2016 | Gupta | H04L 61/3025 709/245 |
| 2016/0294768 A1 | 10/2016 | Khan | |
| 2017/0093793 A1* | 3/2017 | Waldron | H04L 61/3005 |
| 2017/0195285 A1* | 7/2017 | Kakhki | H04L 61/3025 |
| 2023/0022726 A1 | 1/2023 | Vettaikaran et al. | |
| 2023/0164226 A1 | 5/2023 | de Melo et al. | |
| 2024/0106790 A1 | 3/2024 | Vettaikaran et al. | |
| 2024/0113997 A1 | 4/2024 | Vettaikaran et al. | |
| 2024/0121210 A1 | 4/2024 | Guedes et al. | |

OTHER PUBLICATIONS

EP 21718321.9—Response to First Examination Report filed Jan. 3, 2024, 16 pages.
EP 21718321.9—Summons to Oral Proceedings dated Mar. 13, 2024, 7 pages.
PCT IPER in PCT/US2021/022866 dated Sep. 29, 2022 9 pages.
PCT/US2021/022866—International Search Report and Written Opinion dated Aug. 9, 2021, 16 pages.
EP 21718321.9—Written Submissions as filed in response to Summons to Oral Proceedings filed Aug. 16, 2024, 32 pages.

* cited by examiner

Example Resource Records 210

| Type | Description | Function |
|---|---|---|
| CNAME | Canonical Name Record | Alias of one name to another name |
| A | Address Record | 32 bit IPv4 address |
| AAAA | Address Record | 128 bit IPv6 address |
| MX | Mail Exchange Record | Maps a domain name to a list of message transfer agents for that domain |

FIG. 2

Case #1: Conflicted Records 310

Resource Record 312

```
ServiceId: 1
Payload:
  [
    {
      Host: '@',
      Record: 'A',
      Value: '72.3.2.1'
    },
  ]
```

Resource Record 314

```
ServiceId: 2
Payload:
  [
    {
      Host: '@',
      Record: 'AAAA',
      Value: '2001:0db8:85a3:0000:0000:8a2e:0370:7334'
    },
  ]
```

FIG. 3A

Case #2: Conflicted Records 315

Resource Record 317

```
ServiceId: 1
Payload:
  [
    {
      Host: '@',
      Record: 'A',
      Value: '72.3.2.1'
    },
  ]
```

Resource Record 319

```
ServiceId: 2
Payload:
  [
    {
      Host: '@',
      Record: 'A',
      Value: '73.6.4.5'
    },
  ]
```

FIG. 3B

Case #3: Non-Conflicting Records on Different Hosts 320

Resource Record 322

```
[
  {
    Host: 'blog',
    Record: 'A',
    Value: '72.3.2.1'
  },
]
```

Resource Record 324

```
[
  {
    Host: '@',
    Record: 'AAAA',
    Value: '6812:0db7:85a3:0000:0000:8a2e:1052:0310'
  },
]
```

FIG. 3C

Case #4: Non-Conflicting Records on Same Hosts 330

Resource Record 332

```
[
  {
    Host: '@',
    Record: 'A',
    Value: '72.3.2.1'
  },
]
```

Resource Record 334

```
[
  {
    Host: '@',
    Record: 'MX',
    Value: 'examplemail.startrekenterprise.com'
  },
]
```

FIG. 3D

Current DNS Records (Domain Connected to Hosting) 401

| Type | Host | Value | connectionId | groupId |
|------|------|-------|--------------|---------|
| A | @ | 1.1.1.1 | 57 | web |
| A | mail | 1.1.1.1 | 57 | email |
| MX | @ | mail.example.com | 57 | email |
| A | cpanel | 1.1.1.1 | 57 | system |

DNS for New Connection (Gsuite) 411

| Type | Host | Value |
|------|------|-------|
| MX | @ | mail.google.com |

Resulting DNS Records (Partial Conflict Resolution) 421

| Type | Host | Value | connectionId | groupId |
|------|------|-------|--------------|---------|
| A | @ | 1.1.1.1 | 57 | web |
| MX | @ | mail.google.com | 58 | null |
| A | cpanel | 1.1.1.1 | 57 | system |

SYSTEMS AND METHODS FOR DETECTING CONFLICTS IN INTERNET SERVICES

PRIORITY APPLICATIONS

This application is a continuation of U.S. patent application Ser. No. 17/875,824, titled "Systems and Methods for Detecting Conflicts in Internet Services", filed Jul. 28, 2022, which is a continuation of U.S. patent application Ser. No. 17/344,824, titled "Systems and Methods for Detecting Conflicts in Internet Services", filed Jun. 10, 2021, which is a continuation of U.S. patent application Ser. No. 16/823,265, titled "Systems and Methods for Detecting Conflicts in Internet Services", filed Mar. 18, 2020. The priority non provisional applications are hereby incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE TECHNOLOGY DISCLOSED

The technology disclosed relates generally to domain name systems (DNS), and in particular relates to detection and resolution of conflicts between requested internet services and internet services associated with a domain.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Administrators or owners of domains in a domain name system (DNS) can add or remove internet services associated with their domains. For example, an email service can be associated with a domain allowing the users of the domain to send and receive emails. A disk storage service can also be associated with a domain to allow users to store and access documents and other data. Conflicts can arise between internet services associated with a domain and requested internet service due to various reasons. For example, a conflict can arise when an administrator of a domain attempts to connect a new email service with a domain that already has an email service associated with it. Similar conflicts can arise between plugins associated with a domain and a new plugin requested for the domain. Examples include plugins that provide website building functionality. The conflicts between internet services, plugins or products can result in disruption of service provided by the domain. The disruption of service can result in poor user experience and possibly loss of revenue for domain owners. Moreover, when conflicts occur between internet services, the administrators need to debug the system to find the cause of the failure, determine the conflict and then manually resolve the conflict.

Accordingly, an opportunity arises for the development of a conflict detection and resolution system that can automatically detect conflicts before association of internet services to domains that can cause disruption of services provided by the domain. The conflict detection and resolution system can save maintenance time by automatically resolving the detected conflict or suggesting possible resolution options to an administrator.

SUMMARY

Described with reference to example implementations are systems and methods for detecting conflicts between a requested internet service and a package of internet services. The disclosed technology provides method and conflict detection system that can automatically detect conflicts between a requested internet service for example, an email service, a disk storage service or plugins etc. and a package of internet services associated with a domain name system (DNS) domain. The system can include one or more processors coupled to memory which is loaded with computer instructions to detect conflicts between a requested internet service and a package of internet services. The computer program instructions when executed implement a method including receiving a request from a client to add a requested internet service to a package of internet services. The method includes searching a domain name system (DNS) database for DNS records or a DNS server for external domains having attribute fields indicating attributes of the internet services in the package of internet services. The method includes comparing attributes of the requested internet service to attribute fields for the internet services in the package of internet services using a set of conflict definitions to identify attributes of the internet service requested, conflicting with attributes of the package of internet services. The method includes invoking a resolution process to resolve the conflict whenever conflicting attributes are identified.

In one implementation, resolving the conflict further includes at least initiating a request for a selection from one of the three options: (1) removing a conflicting service from the package internet services and adding the internet service requested (2) preserving the internet services in the package and declining the request to add the internet service, and (3) using a subdomain instead of a domain included in the request from the client. Resolving the conflict can further include initiating a custom resolution widget application. In such an implementation, the method can include receiving a selection and triggering a further process to implement the selection requested.

Each internet service in the package of services can be assigned a group identified by a service type or a product type. Resolving the conflict further includes, removing internet services in the group when at least one attribute of at least one internet service in the group conflicts with at least one attribute of the requested internet service. All internet services in the group can be removed when one of the internet services in the group is in conflict.

One or more internet services can be assigned to a dependent group (such as systems group) of internet services. Internet services assigned to the dependent group can exist in the package of internet services when internet services assigned to at least one other group are present in the package of internet services. In one implementation, the method includes removing all internet services in the dependent group from the package when conflict resolution process results in removal of all other internet services from the package of internet service.

In one implementation, the method includes invoking a lookup process to locate domain names for the internet services in the package whenever no internet services are found in the database.

In one implementation, the method includes determining that a payload of the request indicates the request is for a consumer (e.g., host) or a provider (e.g., domain) Whenever the request is for a consumer, the method includes initiating a configuration widget appropriate to the consumer and otherwise at least initiating a configuration widget appropriate to the provider. One example internet service includes a tool for designing a website.

The conflicting attributes can be selected from a set of resource records consisting of: an IPv4 address of a domain host, an IPv6 address of a domain host, a canonical name enabling one domain name to map to another domain name, an email server, a name server record for a domain host, and a record containing information for use outside of a DNS server. This set of resource records is presented as an example. It is understood that the system can also compare attributes of resource records not presented in the above example.

Methods and computer program products which can be executed by computer systems are also described herein.

Other aspects and advantages of the present invention can be seen on review of the drawings, the detailed description and the claims, which follow.

BRIEF DESCRIPTION OF THE DRAWINGS

The invention will be described with respect to specific embodiments thereof, and reference will be made to the drawings, which are not drawn to scale, and in which:

FIG. 2 is a table with selected examples of resource records types and their descriptions.

FIGS. 3A and 3B present examples of conflicting resource records.

FIGS. 3C and 3D present examples of non-conflicting resource records.

DETAILED DESCRIPTION

Figure 1:
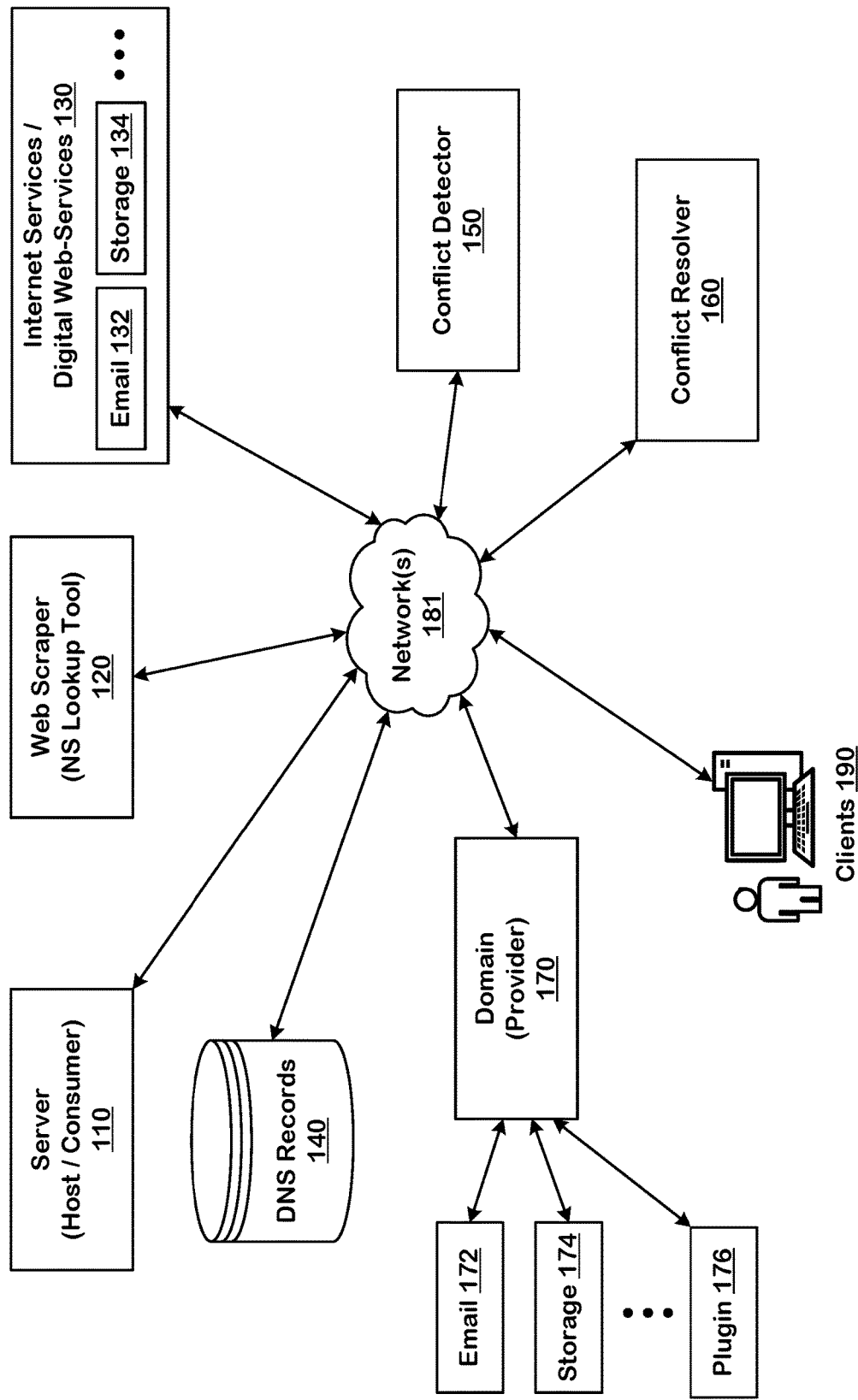
FIG. 1 is a simplified diagram of one environment 100 implementing the technology disclosed for conflict detection and conflict resolution.

The Domain Name System (DNS) is used on the Internet to provide a standard naming convention for locating IP-based computers. The DNS is a distributed database system for managing host names and their associated Internet Protocol (IP) addresses. A single server might be responsible for knowing host names and IP addresses for a small part of a zone, but DNS servers can together map all domain names to the IP addresses. DNS implements a hierarchical naming system called the domain namespace. We now briefly present some DNS concepts.

DNS Servers are computers that run DNS server programs containing DNS database information about the DNS domain tree structure. DNS servers also attempt to resolve client queries. When queried, DNS servers can provide the requested information or provide a pointer to another server that can help resolve the query or respond that it does not have the information or that the information does not exist.

DNS resolvers are programs that use DNS queries to query for information from servers. Resolvers can either communicate either with remote DNS servers or the DNS server program running on the local computer.

Resource Records are sets of information in the DNS database that can be used to process client queries. Each DNS server contains the resource records it needs to answer queries for the portion of DNS namespace for which it is authoritative. A DNS server is authoritative for a contiguous portion of the DNS namespace if it contains information about the portion of the namespace. Resource records are used to store data about domain name and IP addresses. A resource record specifies information about a domain such as an IP address, a mail server receiving email for the domain, mapping of an alias domain name to a canonical (true) domain name, etc.

Zone are contiguous portions of the DNS namespace for which the server is authoritative. A server can be authoritative for one or more zones. Zone files contain resource records for the zones for which the server is authoritative.

Administrators of domains can add internet services (also referred to as digital services or web services) to their domains. An internet service (or simply a service) can be a product, subscription or functionality that a user can engage with in order to use a website effectively. Examples of such services include email, disk space or plugins such as EasyWP™ WebsiteBuilder™, etc. One or more resource records can be generated per service and stored as part of the resource records table for a domain Conflicts can arise between services when administrators attempt to add new services to a domain Such conflicts can arise due to multiple reasons. A new requested service can be incompatible with one or more of the existing services associated with the domain. For example, if an administrator attempts to connect a cloud-based email hosting service with a domain that is already connected to private email hosting service, a conflict can arise as two email hosting services cannot be connected to the domain simultaneously. Such conflicts can result in integration issues leading to disruptions in domain related services. Manually detecting these conflicts can require considerable resources and may impact end customer experience. The technology disclosed automatically detects such conflicts and attempts to resolve the conflicts by proposing solutions to the administrator.

Environment

We describe a system for conflict detection and conflict resolution between internet services associated with domains. FIG. 1 is a simplified diagram of one environment 100 of the system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of the system 100. The figure illustrates a server 110, web scrapper 120, internet services (also referred to as digital services or web services) 130, DNS records 140, a conflict detector 150, a conflict resolver 160, a domain 170, a network(s) 181 and clients 190. The internet services 130 can comprise email services 132, storage services 134, etc. The domain 170 can have various associated internet (or digital) services such as an email 172, a disk storage 174, and a plugin 176, associated with it.

Server (also referred to as DNS server) 110 can store information about zones. We have shown only one server in system 100 for simplifying the illustration. It is understood that more than one server can be used in a distributed manner to respond to queries for resolving domain names. For example, when a DNS server receives a DNS query, it attempts to locate the requested information by retrieving data from its local zone. The DNS database namespace (directory) is split into zones and sub-zones. A zone is a point of delegation within the DNS tree so that a name server is authoritative for the domains that are grouped within the zone and any sub-zones below it. A primary name server is where the zone's domain names and host resource records are loaded manually into the configuration database. The secondary name servers populate their databases from the primary DNS server. The zones are expressed in the form of resource records. These records can be transferred between DNS servers. DNS servers perform caching, whenever they receive information from other servers, they store the information for a certain amount of time.

To resolve domain names, the DNS servers access their zones. The zones contain resource records. A DNS records database 140 can be used to store resource records. The resource records contain information associated with the DNS domain. For example, some resource records map friendly names to IP addresses, others map IP addresses to friendly names, resource records can indicate services, products or plugins associated with a domain name. If the DNS server or the web server cannot find resource records for a domain in the DNS records database 140, it can apply a web scrapper 120 to search external databases for resource records associated to a domain name NsLookUp is an example software tool that can be used to lookup a domain name. The tool can query external DNS databases and retrieve requested resource records that are associated with the domain name. Other types of web scrapping tools can be used to gather resource records from external databases.

Administrators or owners of domains can associate internet services with their domains using clients 190. End users of the domain and their services can also access the system using clients 190. The internet services can include cloud-based or private email, cloud-based disk storage services or other types of services such as plugins for website development, etc. Each internet service defines one or more resource records that are associated with the domain. Resource records can include attributes for example, an "owner" identifier indicating the name of the host of the DNS domain name to which this resource record belongs; "time to live" (TTL) indicating the length of time that a DNS server or a resolver should cache this record entry before it is discarded, a "type" identifier indicating the type of resource record, a "value" of resource identifiers, etc. The resource records can also include values for attributes of the internet services. The services are associated with a DNS domain via resource records. FIG. 1 shows a DNS domain 170 with an email 172, a disk storage 174 and a plugin 176 associated with it. There may be other internet services associated with the DNS domain 170 not shown in the figure.

When an administrator of a domain attempts to connect a new internet service with the DNS domain 170, the conflict detector 150 includes the logic to detect a possible conflict of the requested internet service with the existing internet services associated with the domain. For example, the administrator may attempt to connect a new email service with the DNS domain 170. As the DNS domain 170 already has an email 172 associated with the domain 170, the conflict detector will detect a conflict between the requested internet service and the existing internet service. The conflict detector 150 can compare attributes of resource records for the requested internet service with attributes of resource records in the package of internet services associated with the domain 170 and use a set of conflict definitions to identify attributes of the requested internet service conflicting with the attributes of the package of internet services. Thus, the conflict detector 150 can prevent any interruptions of the services provided by the DNS domain by detecting conflicts before the requested internet service is associated with the domain. The conflicts can result in expensive debugging and maintenance activities and also result in poor customer experience for the users of the DNS domain.

The technology disclosed not only detects conflicts of the requested internet service with the package of internet services already associated with the DNS domain but also provides conflict resolution options to owners or administrators of the DNS domain. The conflict resolver 160 can also automatically resolve the conflicts using one of the resolution options or present the options to an administrator to select a resolution for the detected conflict. A first conflict resolution option can include selecting an alternate internet service in the package of internet services to substitute for the requested internet service. A second conflict resolution option can include replacing an existing connection with a service in the package of internet services with the requested internet service. A third option for conflict resolution can include initiating a custom resolution application that can include presenting a custom application or a widget to the administrator for this purpose. The administrator can then interact with the widget to resolve the conflict.

Completing the description of FIG. 1, the components of the system 100, described above, are all coupled in communication with the network(s) 181. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi and WiMAX. The engines or system components of FIG. 1 are implemented by software running on varying types of computing devices.

Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Resource Records

We now present examples of a few selected resource records types as presented in a table 210 in FIG. 2. The canonical name (CNAME) resource record creates an alias (synonymous name) for the specified DNS domain name. The CNAME records can hide implementation details of the network from clients that connect with it. For example, suppose we want to put an FTP (file transfer protocol) server named "ftp1.example.com" on our domain "example.com" and suppose we know that we will move the FTP server to another computer named ftp2 in the future, but we do not want the users of our domain to know about this change. We can create an alias called "ftp.example.com" and point it to "ftp1.example.com". When we move our FTP server to the new computer, we can change the CNAME record to point to "ftp2.example.com". The CNAME record for the above example is shown below:

ftp.example.com IN CNAME ftp1.example.com

The "IN" attribute indicates a network protocol used to locate and connect to computers on the network. Transmission Control Protocol/Internet Protocol or TCP/IP is commonly used for this purpose.

The second example of resource records in table 210 is an address record or "A" record. The A resource record maps the DNS domain name to a 32-bit IPv4 IP address. For example, the following "A" resource record maps the domain name of the server to its IP address:

example.com IN A 172.16.27.1

The third example of resource records in the table 210 is an "AAAA" resource record. This is an address record that maps a host to its 128-bit IPv6 address.

The fourth example of resource records in table 210 is a mail exchange (MX) resource record. The MX resource record specifies a mail exchange server for a DNS domain name. A mail exchange server is a host that will either process or forward mail for the DNS domain name. Processing the mail means either delivering it to the addressee or passing it to a different type of mail transport. Forwarding the mail means sending it to its final destination server, sending it using Simple Mail Transfer Protocol (SMTP) to another mail exchange server that is closer to the final destination, or queuing it for a specified amount of time. An example of an MX record is presented below:

example.com IN MX mailserver.example.com

The first three fields in the above MX resource record example identify the DNS domain name (example.com), class (IN) and type (MX). The last field is the address of the mail exchange server associated with the DNS domain. Note that additional attributes may be included in the example resource records presented above. We have presented some of the attributes for each resource record type as examples for illustration purposes. We present further examples of resource records in the following text to illustrate conflict detection.

Example of Conflicting and Non-Conflicting Resource Records

We now present examples of conflicts that can occur due to new resource records established by a requested service (or a new service). The conflicts can occur due to different reasons. For example, a new service can be established by a different type of resource record than an existing service in the package of services. However, these two resource records can cause a conflict as shown in case 1 (FIG. 3A). In case 2 (FIG. 3B) we present another scenario in which two different services are established by the same type of records with different values thus causing conflict.

FIG. 3A presents an example 310 of conflict between a requested internet service and package of internet services associated with a domain Consider a domain "example.com" that has one or more internet services in a package of services associated with it. The domain has resource records corresponding to these services associated with it. An example resource record 312, is shown in FIG. 3A. We have included a service identifier in the resource records to indicate the service established by the resource record. For example, the resource record 312 is related to service with a service identifier "1". Three attributes of the resource record 312 are shown for illustration purposes in the payload portion. The attributes indicate that the name of the host computer is "@" which is also referred to as root host. The record type is "A" which is 32-bit IPv4 address of the host. The value of the address is "72.3.2.1". Note that these values are presented as examples for illustration purposes only. Further consider that the owner or administrator of the domain "example.com" starts integrating the domain with a second internet service (serviceId=2) that is established by a resource record 314. The technology disclosed detects a conflict between the package of services associated with the domain, although the two resource records 312 and 314 are of different types.

The technology disclosed compares the attributes of resource records 312 and 314 and determines that conflict exists between "A" and "AAAA" resource records as both records are attempting to set two different values for the same host "@". The conflict detector determines that if requested internet service is connected to the domain and resource record 314 is associated with the domain then existing internet service with a resource record 312 will not be available for use with the domain. As a result, the clients can experience a disruption of services provided by the domain. The technology disclosed can present one of the conflict resolution options to the client or automatically apply one of the conflict resolution options.

FIG. 3B illustrates another example of conflicting records. In this case the existing service (serviceId=1) is established by an "A" type resource record 317. A new service (serviceId=2) is connected to the domain and is established by a resource record 319. The resource record 319 is also an "A" type resource record. In this example, a conflict is detected between a new service and an existing service due to the same type ("A") of resource records associated with the two services. The resource record 319 is attempting to set a new value for "A" type record for the host thus causing the conflict. The technology disclosed will detect the conflict and automatically resolve the conflict or present resolution options to the domain administrator or owner.

In the following two examples presented in FIGS. 3C and 3D, we present examples of non-conflicting resource records. FIG. 3C illustrates an example 320 of non-conflicting records of different types. Note that in this example, the existing resource record 322 includes an "A" type resource record for a subdomain "blog.example.com" of the "example.com" domain. When the owner or the administrator starts integrating a new internet service with the domain "example.com", the requested internet service sets a resource record 324. The resource record 324 is an "AAAA" type record however, it sets the value for the root ("example.com") and not the subdomain "blog.example.com". The conflict detection logic determines that the two resource records 322 and 324 are assigned to different domains therefore after integration of the requested internet service both internet services will be available. Thus, no conflict is detected, and the domain administrator is allowed to connect the requested internet service with the domain.

FIG. 3D presents another example 330 of non-conflicting resource records. In this example, the existing resource record 332 associated with the domain "example.com" is of record type "A". The administrator of the domain requests a new mail service for the domain. The requested internet service sets a resource record of type "MX". The "A" record sets a 32-bit IPv4 address for the host. The "MX" record sets a value of the mail exchange server associated with the domain Both resource records are associated to the root host ("example.com"). However, the two resource records are related to different types of internet services and have no conflict between them. The conflict detection logic determines that there is no conflict between the existing resource record 332 and the resource record 334 for the requested internet service.

Partial Conflict Resolution

Figure 4:
FIG. 4 is an example of partial conflict detection and resolution.
Figure 4:

The technology disclosed can also resolve partial conflicts between requested internet service and the package of internet services. There are cases when complex internet services can be associated with a domain Such complex internet services can comprise of more than one services. For example, an internet service can include email service, website builder plugins, calendar features, contact management features, disk storage, etc. Each one of the constituent services in the complex internet service can set multiple resource records associated with the domain A requested internet service may conflict with one or few of the services in the group of services in the complex internet service associated with the domain Manual resolution of such conflicts can result in removal of the entire group of internet services even if the conflict of the requested service is with one of the services in the group of services. The technology disclosed can apply partial conflict detection to detect the service in the group of internet services with which the requested internet service conflicts. The technology disclosed can assign product or service identifiers to services in the group of services. These identifiers can identify a product type or service type for the internet service in the group of internet services. The technology disclosed includes logic to resolve the conflict by removing or disabling internet services in the group belonging to a particular product type or service type when at least one attribute of at least one service in that product type or service type conflicts with at least one attribute of the requested internet service. Services belonging to non-conflicting product type or service type are not removed from the package of services associated with the domain Example of Partial Conflict Resolution FIG. 4 presents an example of partial conflict detection and resolution. A table 401 lists some of the existing resource records associated with the domain. The table shows a resource record type for each entry in the table, the host name, a value for the resource record, a connection identifier and a group identifier (groupID). The group identifier is the product type or service type as described above and identifies the product group or service group with which the record is associated. For example, the first resource record in the table 401 is related to the "web" product type. The second and third resource records are related to "email" service and the fourth resource record is of "system" service type. A table 411 shows resource records for the requested internet service. The requested service is an email service as indicated by the record type field "MX" in the first column. The technology disclosed includes logic to determine a service or product type of the requested internet service by matching the new resource record in table 411 with existing resource records in table 401. The logic results in match of the new resource record with the third resource record in the table 401 due to match of type field values "MX" in both records. The conflict detection logic, then identifies the service type or product type of the conflicting record by querying the groupID field. The query result indicates that the conflicting service type is an "email" service. The conflict resolution logic, therefore, removes the resource records belonging to the email service type in table 401 and includes the resource record for the requested internet service. The resulting table 421 lists the updated resource records after inclusion of requested internet service and removal of the conflicting email service in the package of services associated with the domain.

We now present process flowcharts illustrating the conflict detection and conflict resolution process steps. The logic can be implemented using processors programmed using computer programs stored in memory accessible to the digital collaborative workspace system and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow chart herein shows only steps that are pertinent to an understanding of the invention, and it will be understood that numerous additional steps for accomplishing other functions can be performed before, after and between those shown.

Conflict Detection—Process Flowchart

Figure 5:
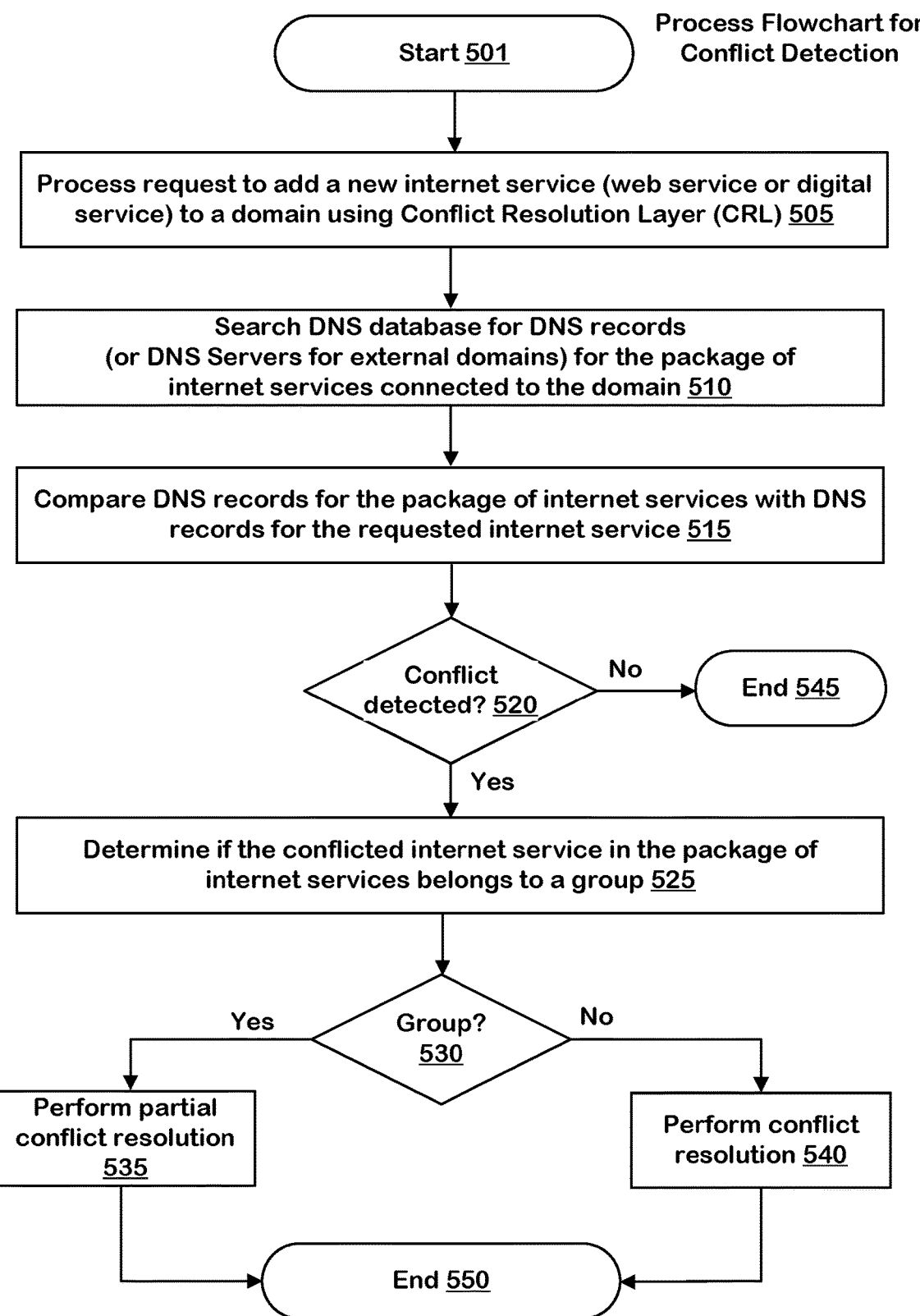
FIG. 5 is a process flowchart presenting process steps for conflict detection.

FIG. 5 presents conflict detection process in flowchart 500. The process starts at a step 501. At a step 505 the system processes a request to add a new internet service to a domain. The system applies conflict detector 150 to detect conflict between the requested internet service and the package of internet services associated with the domain. In one implementation, the conflict detection logic is implemented in conflict resolution layer. At a step 510, the system searches DNS databases for DNS records. If the DNS domain is maintained by an external server, the system includes logic to search DNS servers for external domains. As a result of this search the system receives resource records associated with the domain. At a step 515, the process includes comparing the DNS resource records for the package of internet services associated with the domain with the resource records of the requested internet service. If no conflict is detected at a step 520, the process ends at a step 545. Otherwise, if a conflict is detected at a step 520, the process continues at a step 525. The process includes determining whether the conflicting internet service in the package of internet services belongs to a service type or product type group. If the conflicted service in the package of services belongs of a service type or product type group (step 530), the process continues at a step 535 to perform partial conflict resolution 535. Otherwise, the process continues at a step 540 to perform conflict resolution. The process ends at a step 550.

Conflict Resolution—Process Flowchart

Figure 6:
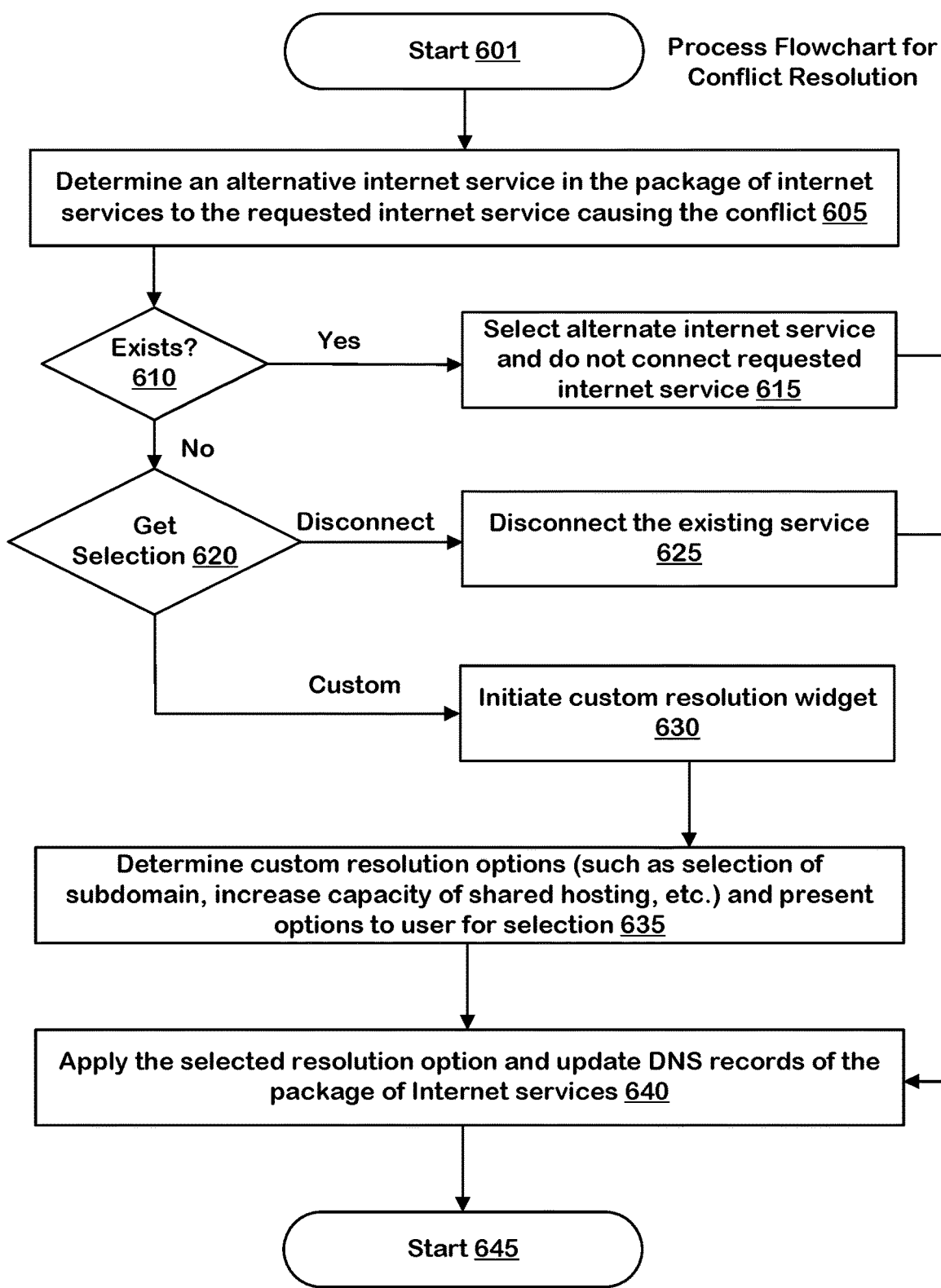
FIG. 6 is a process flowchart presenting process steps for conflict resolution.

FIG. 6 presents conflict resolution process flowchart. The process starts at a step 601. At a step 605, the process determines if there exists an alternate internet service in the package of internet services that can be used in place of the requested internet service. If a service exists (step 610) in the package of internet services, then the process continues at a step 615 and selects alternate internet service in the package of services. The conflict resolution logic in this resolution option does not add the requested internet service to the package of internet services.

If the conflict resolution logic determines that an alternative to the requested internet service does not exist in the package of services then the process requests the domain administrator to select the requested service and presents the service that will be disconnected from the package of internet services to resolve the conflict with the requested service (step 625). The process continues to step 640 in which the system applies the selected resolution option and updates the resource records of the package of internet services associated with the domain.

The system can also present a third resolution option by invoking a custom conflict resolution widget or application (step 630). The process gets input from the domain administrator to apply the selected resolution option and update DNS records to the package of internet services at a step 640. The custom resolution options include selection of a subdomain, increasing the capacity of the shared hosting, etc. The process continues at a step 640 in which the system applies the selected resolution option and updates the resource records of the package of internet services associated with the domain.

The custom conflict resolution logic can include logic to determine if the conflict is on the domain side or the host side and propose respective conflict resolution options. For example, if the conflict is detected on the domain side, the system can propose using a subdomain to resolve the conflict. For "example.com" domain, examples of subdomains can be "blog.example.com", "shop.example.com", "site.example.com", etc. The administrator can select a subdomain for associating the conflicting requested internet service. This can resolve the conflict.

If the system detects that a conflict is present on the host side with shared hosting due to no additional capacity for new domain, the system can propose two options for resolving the conflict. The administrator can update the shared hosting plan to increase its capacity. The administrator can also disconnect one of the already connected domains with the host and connect the new domain with the host. Custom resolution can also propose custom conflict resolutions for specific internet services. The process ends at a step 645.

Sequence of Operations—Conflict Detection and Resolution

Figure 7A:
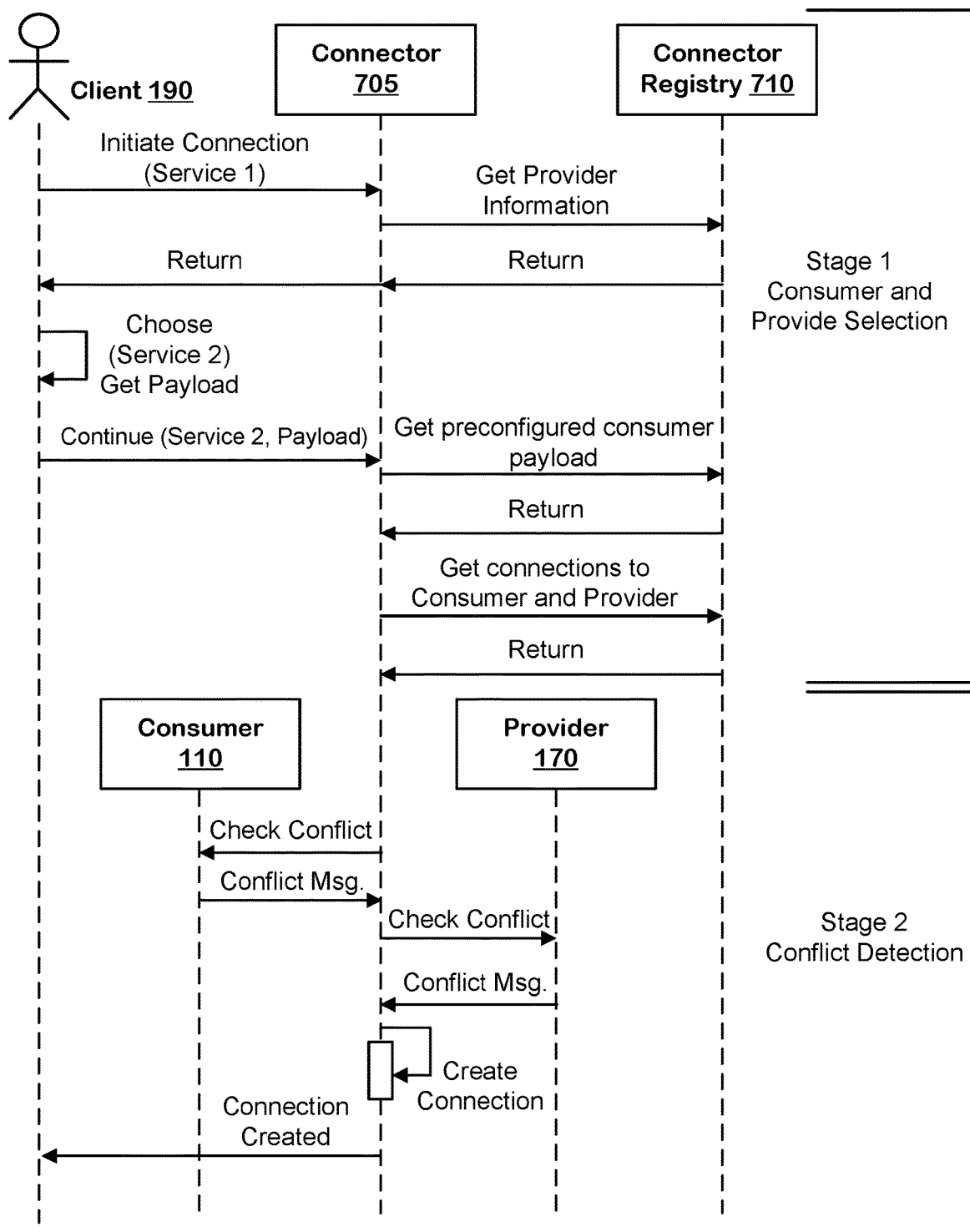
FIG. 7A presents a first sequence diagram illustrating interaction between various actors during first two stages of conflict detection and resolution.
Figure 7B:
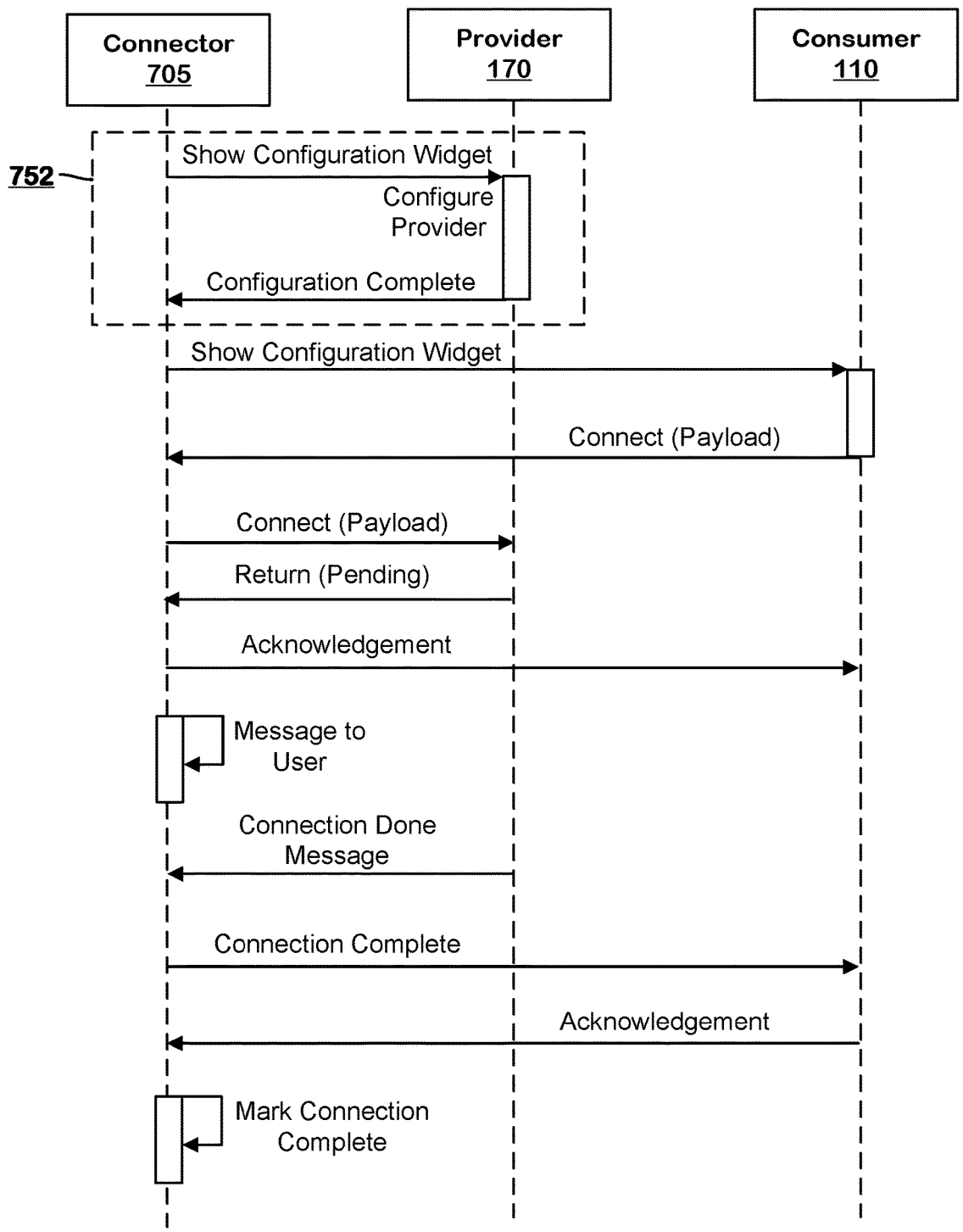
FIG. 7B presents a second sequence diagram illustrating interaction between various actors during the third stage of conflict detection and resolution.
Figure 7C:
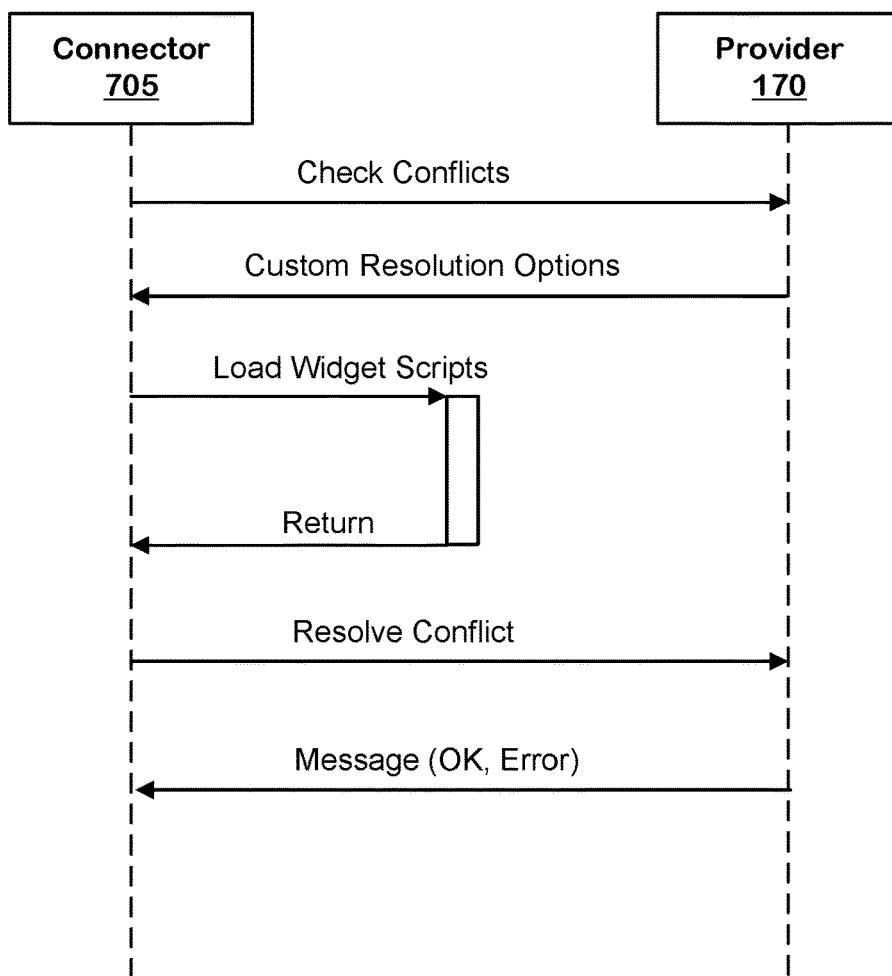
FIG. 7C presents a third sequence diagram for invoking and applying a custom conflict resolution widget.

FIGS. 7A, 7B, and 7C present sequence diagrams for conflict detection and resolution processes.

Actors

FIG. 7A illustrates interaction amongst five actors: a client 190, a connector 705, a connector registry 710, a consumer 110, and a provider 170. As presented above, a client 190 can be an administrator or owner of a DNS domain. The client can interact with the actors using a computing device such as desktop or laptop computers, person digital assistants or a mobile computing devices, etc. The connector 705 is a component of the system that is responsible for creating connection and handling their life-cycle such as disconnection, expiration, etc. The connection registry 710 is a persistent storage (such as database) that stores information about connections and their states. The consumer 110 can be a server or a host that acts as a product or service consumer in the application interaction flow. The provider 170 can be a domain that acts as a product or service provider in the application interaction flow. The DNS domain is an example of the provider 170. An application interaction service (not shown in FIG. 7A) can be responsible for message flow amongst different actors presented above. It is the responsibility of this service to manage internet service connection. The overall message sequence flow is divided into three stages. Stages 1 and 2 are shown in FIG. 7A. Stage 1 includes selection of consumer and provider. Stage 2 is related to conflict detection.

Stage 1 Message Sequence

We first describe the message flow in stage 1 that includes identification of consumer and provider. The message communication in stage 1 includes three actors: client 190, connector 705 and connector registry 710. The process starts with an "initiate connection" message from client 190 to connector 705. This is followed by "get provider information" message from connector 705 to connector registry 710. The connection registry returns a message with provider information which is forwarded by connector 705 to client 190. The messages listed above identify the first internet service (service 1). The client 190 then chooses a second internet service (service 2) and receives the payload. The payload can include attributes and values of resource records for an internet service or a product as shown above in FIGS. 3A to 4. The client 190 then sends a "continue" message to connector 705 with information about service 2 and can include payload with this message. The connector 705 sends a message to connector registry 710 to "get preconfigured consumer payload". The connector registry 710 sends a return message to the connector. Finally, at the end of stage 1, the connector 705 sends a message to connector registry 710 to "get connections to consumer and provider". These connections are also referred to as "hooks". The connection registry 710 sends this information to connector 705 to complete the stage 1 which is also referred to as discovery stage. This stage determines which internet services can be connected to the domain. The stage 2 of the process includes conflict detection and resolution.

Stage 2 Message Sequence

The bottom portion of the message sequence diagram 700 (FIG. 7A) presents message sequence flow for conflict detection and resolution. Four actors are involved in this process: client 190, consume 110, connector 705, and provider 170. The connector 705 sends a "check conflict" message to consumer 110. The message can include provider and payload information. The consumer 110 sends a "conflict message" to the connector 705. The conflict message can indicate if there is a conflict between the selected internet service and package of services associated with the domain. The connector 705 then creates a new connection in the database and sends a confirmation message to the client 190 after the connection is created.

Stage 3 Message Sequence

FIG. 7B is a message sequence diagram 750 that presents flow of messages in stage 3 of the conflict detection and resolution process. In this stage, the system creates a connection between a consumer and provider in an asynchronous manner. The messages shown in a box 752 are shown in further detail in FIG. 7C. These messages are related to custom resolution of conflicts using a configuration widget. Following the message from connector 705 "show configuration widget", the provider 170 configures the provider. After completing the provider configuration, a message "configuration complete" is sent from provider 170 to connector 705.

The connector 705 sends a show configuration widget message to consumer 110. Following this, the consumer 110 sends a "connect" message to connector 705 that includes payload. The connector 705 then sends a "connect" message to provider 170 with payload. The provider 170 sends a "return" message to the connector 705. Following this, the connector sends an "acknowledgement" message to consumer 110. The connector 705 then displays a "message" (such as "thank you") to the client 190. Following this, the provider 170 sends a "connection done" message to connector 705. The connector 705 sends a "connection complete" message to consumer 110. The consumer 110 sends an "acknowledgement" message to connector 705. Finally, the connector 705 marks the connection as complete.

Custom Conflict Resolution Message Sequence

FIG. 7C presents a message sequence diagram for custom conflict resolution widget. The process starts when connector 705 sends a "check conflicts" message to provider 170. The message can include information about the requested internet services and the package of internet services associated with the domain. The provider 170 sends a "custom resolutions options" message to connector 705. Following this, the connector 705 "loads widget scripts", thus initiating the custom conflict resolution widget. The connector 705 then sends a "resolve conflict" message to the provider 170. Finally, the provider 170 sends completion message indicating success (OK) or failure (error) of the custom conflict resolution to the connector 705.

Particular Implementations

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Conflict Detection

A method implementation of the technology disclosed includes detecting conflicts between a requested internet service and a package of internet services. The method includes receiving a request from a client to add a requested internet service to a package of internet services. The method includes searching a domain name system (DNS) database for DNS records or a DNS server for external domains having attribute fields indicating attributes of the internet services in the package of internet services. The method includes comparing attributes of the requested internet service to attribute fields for the internet services in the package of internet services using a set of conflict definitions to identify attributes of the internet service requested, conflicting with attributes of the package of internet services. The method invokes a resolution process whenever conflicting attributes are identified.

In some method implementations, resolving the conflict further includes at least initiating a request for a selection from the following three resolution options: (1) the method includes removing a conflicting service from the package internet services and adding the internet service requested, (2) the method includes preserving the internet services in the package and declining the request to add the internet service, and (3) the method includes using a subdomain instead of a domain included in the request from the client. In some implementations, resolving the conflict further includes at least initiating a custom resolution widget application. In some implementations, the method includes receiving a selection and triggering a further process to implement the selection requested.

Each internet service in the package can be assigned a group based on service type or product type. Resolving the conflict can further include removing internet services in the group when at least one attribute of at least one internet service in the group conflicts with at least one attribute of the requested internet service. The group of services may be identified by a service type identifier or a product type identifier. In some implementations, all internet services in the group are removed when one of the internet services in the group is in conflict.

In some implementations, one or more internet services can be assigned to a dependent group (such as systems group) of internet services. The internet services assigned to the dependent group can exist in the package of internet services when internet services assigned to at least one other group are present in the package of internet services. In such an implementation, the method includes removing all internet services in the dependent group from the package when conflict resolution process results in removal of all other internet services from the package of internet service.

The method includes invoking a lookup process to locate domain names for the internet services in the package whenever no internet services are found in the database.

Some method implementations include determining that a payload of the request indicates the request is for a consumer or a provider. Whenever the request is for a consumer, at least initiating a configuration widget appropriate to the consumer and otherwise at least initiating a configuration widget appropriate to the provider. An example internet service includes a tool for designing a website logo.

In some implementations, conflicting attributes are selected from a set consisting of: an IPv4 address of a domain host, an IPv6 address of a domain host, a canonical name enabling one domain name to map to another domain name, an email server, a name server record for a domain host, and a record containing information for use outside of a DNS server. It is understood that the technology disclosed can detect conflicts for other types of resource records not listed in the above set of examples.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Conflict Resolution

A method implementation of the technology disclosed includes resolving by an applications interaction server, a conflict between a requested internet service (sent to a domain), requested by an internet service requesting server (also referred to as host), and a package of internet services. The method includes, sending to an internet service requesting server, a conflict check result message indicating a presence of a conflict between a requested internet service requested by the requesting server and a package of internet services. The method includes receiving from the internet service requesting server a response including a selected from (i) an alternate internet service in the package of internet services to substitute for the requested internet service; (ii) a request to replace an existing connection with a service in the package of internet services with the requested internet service; and (iii) a request to initiate a custom resolution application pointed on by an address or pointer. The method includes responsively at least initiating, whenever an alternate internet service has been requested, substituting the alternate internet service in the package of internet service for the requested internet service. Otherwise, whenever a request to replace an existing connection with a service in the package of internet services with the requested internet service, disconnecting the existing connection and connecting the requested internet service and including the connected internet service in the package of internet services. Otherwise, whenever a request to initiate a custom resolution, at least initiating invoking the custom resolution application using the address or pointer.

In some implementations, the request to initiate a custom resolution application further includes one or more resolution options. In such implementations, the method further includes passing one or more resolution options to the custom resolution application. One or more resolution options initiated by the custom resolution application further include: detecting whether a conflict type for the conflict is a domain-side conflict or a host-side conflict wherein domain-side conflicts include a resource record conflict and host-side conflicts include a no-capacity conflict, selecting a custom resolution based upon the conflict type detected, and providing the custom resolution to a client. The domain-side conflict further including a private email requested internet service conflicting with a cloud-based email internet service in the package of internet services. The host-side conflict further includes the host not having enough domain slots to connect the requested internet service to the package of internet service. The conflict detected includes a resource record conflict. In such implementations, the method further includes using a subdomain instead of a selected one by receiving instructions provided by the internet service requesting server using API. The conflict detected can include not enough domain slots for additional domains in shared hosting. In such implementations, the method further includes initiating at least one of updating a shared hosting plan to increase capacity; and disconnecting at least one domain already connected and replacing by connecting a new one as requested. In such implementations, the method includes requesting the internet service requesting server respond with a selection selected from the updating a shared hosting plan to increase capacity; and disconnecting at least one domain already connected and replacing by connecting a new one as requested.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Computer System

Figure 8:
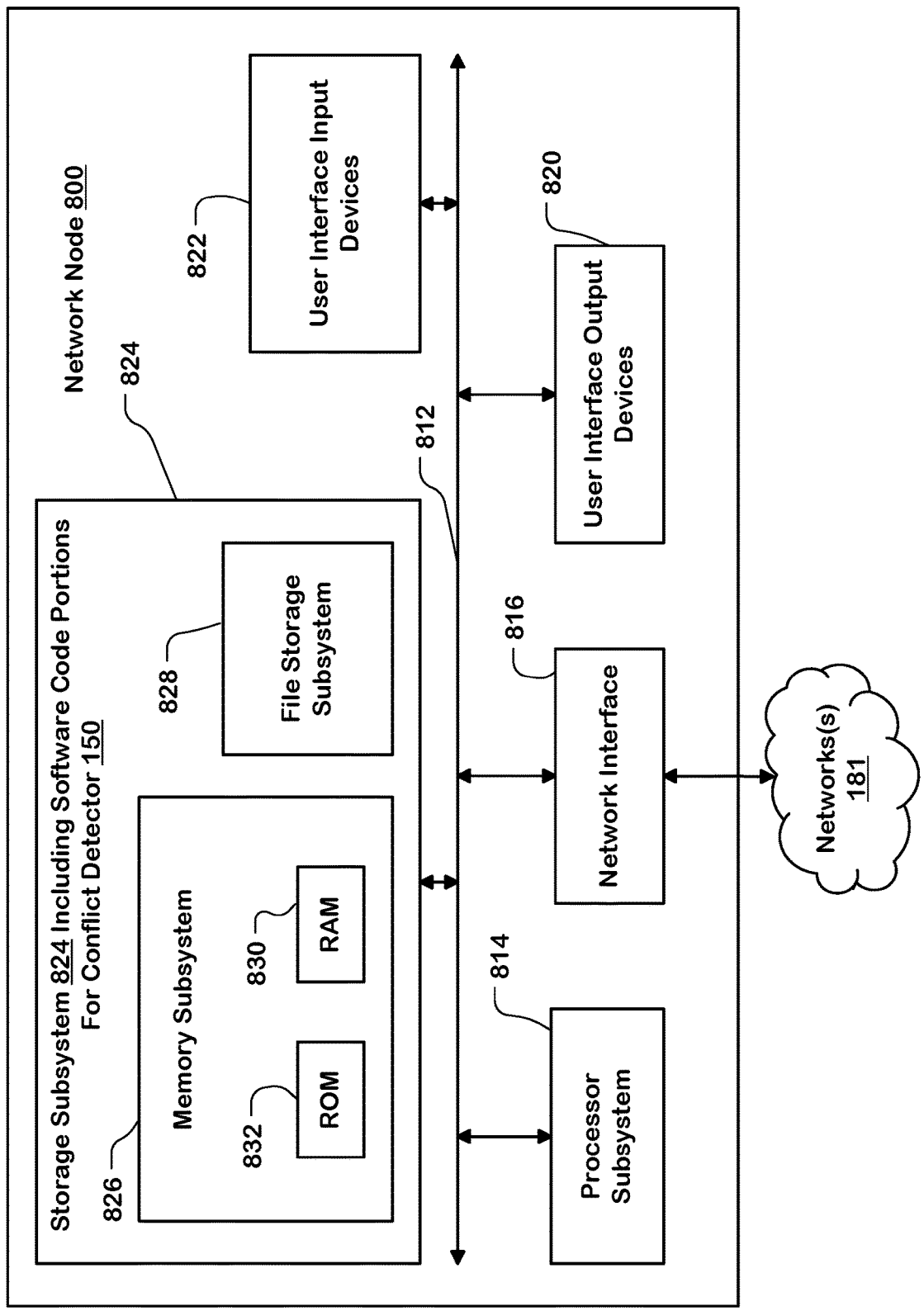
FIG. 8 is a simplified block diagram of a computer system 800 that can be used to implement the conflict detection and conflict resolution system of FIG. 1.

FIG. 8 is a simplified block diagram of a computer system 800 that can be used to implement conflict detection and resolution logic. Computer system 800 includes at least one central processing unit (CPU) as part of the processor subsystem 814 that communicates with a number of peripheral devices via bus subsystem 812. These peripheral devices can include a storage subsystem 824 including, for example, memory devices 826 and a file storage subsystem 828, user interface input devices 822, user interface output devices 820, and a network interface subsystem 816 The input and output devices allow user interaction with computer system 800. Network interface subsystem 816 provides an interface to outside networks, including an interface to corresponding interface devices in other computer systems.

In one implementation, the conflict detector 150 of FIG. 1 is communicably linked to the storage subsystem 824 and the user interface input devices 822.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 820 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 824 stores programming and data constructs that provide the functionality of some or all of the modules and methods described herein. The computer system can include graphics processing units (GPUs) or field-programmable gate arrays (FPGAs).

Memory subsystem 826 used in the storage subsystem 800 can include a number of memories including a main random access memory (RAM) 830 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 800 communicate with each other as intended. Although bus subsystem 812 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present disclosed technology. Many other configurations of computer system 800 are possible having more or less components than the computer system depicted in FIG. 8.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for detecting conflicts between a requested internet service and a set of internet services, comprising:
   receiving a particular domain and the requested internet service to be connected to the particular domain;
   searching for the particular domain connected with the set of internet services in a dataset of domain name systems (DNS) information having attribute fields indicating attributes of internet services;
   comparing attributes of the requested internet service to attribute fields for internet services in the set of internet services connected with the particular domain using a set of conflict definitions to identify attributes of the requested internet service conflicting with attributes of the set of internet services; and
   whenever one or more conflicting attributes are identified, invoking a resolution process to resolve the conflict.

2. The method of claim 1, wherein invoking a resolution process further includes at least initiating a request for a selection from (1) removing a conflicting service from the set of internet services and adding the requested internet service (2) preserving the internet services in the set of internet services and declining to add the requested internet service, and (3) using a subdomain instead of a domain as requested.

3. The method of claim 2, further including receiving a selection and triggering a further process to implement the selection received.

4. The method of claim 1, wherein invoking a resolution process further includes at least initiating a custom resolution widget application.

5. The method of claim 1, wherein each internet service in the set of internet services is assigned a group; and wherein invoking a resolution process further includes removing internet services in the group when at least one attribute of at least one internet service in the group as assigned conflicts with at least one attribute of the requested internet service.

6. The method of claim 5, further including one or more internet services assigned to a dependent group (such as systems group) of internet services wherein internet services assigned to the dependent group can exist in the set of internet services when internet services assigned to at least one other group are present in the set of internet services.

7. The method of claim 6, further including removing all internet services in the dependent group from the set of internet services when conflict resolution process results in removal of all other internet services from the set of internet services.

8. The method of claim 1, further including whenever no internet services are found in the dataset of domain name systems (DNS) information, invoking a lookup process to locate domain names for the internet services in the set of internet services.

9. The method of claim 1, further including:
   receiving a request from a client to add the requested internet service to the set of internet services;
   determining that a payload of the request indicates the request is for a consumer or a provider; and
   whenever the request is for a consumer, at least initiating a configuration widget appropriate to the consumer and otherwise at least initiating a configuration widget appropriate to the provider.

10. The method of claim 1, wherein conflicting attributes are selected from a set of:
    an IPv4 address of a domain host;
    an IPV6 address of a domain host;
    a canonical name enabling one domain name to map to another domain name;
    an email server;
    a name server record for a domain host; and
    a record containing information for use outside of a DNS server.

11. A system including a memory coupled with one or more processors, the memory loaded with computer instructions to detect conflicts between a requested internet service and a set of internet services, which computer instructions, when executed on the processors, implement actions comprising:
    receiving a particular domain and the requested internet service to be connected to the particular domain;
    searching for the particular domain connected with the set of internet services in a dataset of domain name systems (DNS) information having attribute fields indicating attributes of internet services;
    comparing attributes of the requested internet service to attribute fields for internet services in the set of internet services connected with the particular domain using a set of conflict definitions to identify attributes of the requested internet service conflicting with attributes of the set of internet services; and whenever one or more conflicting attributes are identified, invoking a resolution process to resolve the conflict.

12. A non-transitory computer readable storage medium impressed with computer program instructions to detect conflicts between a requested internet service and a set of internet services, which computer program instructions, when executed on a processor, implement a method comprising:

receiving a particular domain and the requested internet service to be connected to the particular domain;

searching for the particular domain connected with the set of internet services in a dataset for domain name systems (DNS) information having attribute fields indicating attributes of internet services;

comparing attributes of the requested internet service to attribute fields for internet services in the set of internet services connected with the particular domain using a set of conflict definitions to identify attributes of the requested internet service conflicting with attributes of the set of internet services; and whenever one or more conflicting attributes are identified, invoking a resolution process to resolve the conflict.

13. The non-transitory computer readable storage medium of claim 12, wherein invoking a resolution process further includes:

initiating a request for a selection from (1) removing a conflicting service from the set of internet services and adding the requested internet service (2) preserving the internet services in the set of internet services and declining to add the requested internet service, and (3) using a subdomain instead of a domain as requested.

14. The non-transitory computer readable storage medium of claim 13, further implementing actions comprising, receiving a selection and triggering a further process to implement the selection requested.

15. The non-transitory computer readable storage medium of claim 12, wherein invoking a resolution process further includes at least initiating a custom resolution widget application.

16. The non-transitory computer readable storage medium of claim 12, wherein each internet service in the set of internet services is assigned a group; and wherein invoking a resolution process further includes removing internet services in the group when at least one attribute of at least one internet service in the group as assigned conflicts with at least one attribute of the requested internet service.

17. The non-transitory computer readable storage medium of claim 16, further including one or more internet services assigned to a dependent group (such as systems group) of internet services wherein internet services assigned to the dependent group can exist in the set of internet services when internet services assigned to at least one other group are present in the set of internet services.

18. The non-transitory computer readable storage medium of claim 17, further including removing all internet services in the dependent group from the set of internet services when conflict resolution process results in removal of all other internet services from the set of internet services.

19. The non-transitory computer readable storage medium of claim 12, further including whenever no internet services are found in the dataset, invoking a lookup process to locate domain names for the internet services in the set of internet services.

20. The non-transitory computer readable storage medium of claim 12, further including:

receiving a request from a client to add the requested internet service to the set of internet services;

determining that a payload of the request indicates the request is for a consumer or a provider; and whenever the request is for a consumer, at least initiating a configuration widget appropriate to the consumer and otherwise at least initiating a configuration widget appropriate to the provider.

* * * * *